United States Patent [19]
Heinz

[11] Patent Number: 5,131,712
[45] Date of Patent: Jul. 21, 1992

[54] TILT-OPEN DEVICE FOR TRUCK BOX COVERS

[76] Inventor: David S. Heinz, Box 30, Hay Lakes, Alberta, Canada, T0B 1W0

[21] Appl. No.: 731,999

[22] Filed: Jul. 18, 1991

[51] Int. Cl.$^5$ .............................................. B60P 7/02
[52] U.S. Cl. .................................................. 296/100
[58] Field of Search ............................. 296/100, 164

[56] References Cited

U.S. PATENT DOCUMENTS

| | | | |
|---|---|---|---|
| 2,886,375 | 5/1959 | Crawford | 296/100 |
| 3,489,456 | 1/1990 | Klanke | 296/100 |
| 3,913,969 | 10/1975 | Hoch | 296/100 |
| 3,923,334 | 12/1975 | Key | 296/100 X |
| 4,101,162 | 7/1978 | Koehn | 296/100 |
| 4,142,760 | 3/1979 | Dockery et al. | 296/100 |
| 4,462,631 | 7/1984 | Lange | 296/160 |
| 4,629,243 | 12/1986 | Jensen | 296/100 |
| 4,738,274 | 4/1988 | Heath | 296/100 X |
| 4,819,981 | 4/1989 | Moe et al. | 296/100 |
| 4,832,394 | 5/1989 | Macomber | 296/100 |

*Primary Examiner*—Margaret A. Focarino
*Assistant Examiner*—Joseph D. Pape

[57] ABSTRACT

The specification discloses a device for tilting a truck box cover to an angular position thus providing improved access to the cargo area. The box cover is mounted to the side of the truck box by a hinge. The box cover is assisted in lifting to an open position and held open by an actuator which may be a single gas spring or a screw powered by an electric motor. The actuator is positioned near the front of the truck box so it causes minimum obstruction of the cargo space. The device may be used with conventional truck box covers. The box cover can be stabilized in a non-closed position by a steady strut. A restraint prevents over-opening of the box cover. A strong frame prevents excessive deflections of the box cover and enables the use of one actuator.

6 Claims, 15 Drawing Sheets

TILT-OPEN DEVICE FOR TRUCK BOX COVERS

FIELD OF THE INVENTION

The invention relates to covers for the cargo box of light trucks.

BACKGROUND OF THE INVENTION

In the use of light trucks, covers the truck box are often employed. Box covers are useful for protecting the box and cargo from weather, and for protecting the cargo from theft or damage from animals. Some covers are similar to flat lids and are about the height of the top of the truck box. In order to be able to accommodate much higher cargo, some covers have sides, a top, a front, and a back. The box covers to which the invention is directed are non-fabric covers. When using a box cover, certain problems may be encountered. The access to the cargo area is usually through a hinged door at the rear of the box cover. The rear end of the box cover rotates upward and the rear of the truck box rotates downward, creating the access port. Generally it is not possible for a person to enter the cargo area while standing upright. This makes it inconvenient to enter, leave and generally work in the cargo space. It makes it hard to carry objects while stooping. An overhead crane can't usually be employed to handle heavy items. A wheeled dolly is usually not useable because the space available is too low. Even though may canopies have windows which open, it tends to be hot and less well-ventilated within the cargo area than outside it.

Another problem is the limitation on the maximum height of a cargo item. The higher the object which may enter the cargo area, the more useful the truck and cover will be. Many canopies have a lintel which is over the cargo access door at the rear of the canopy. This lintel makes the top stronger but also decreases the height of the access opening. If an object is higher than the available space, the item cannot be transported unless the canopy is removed from the truck beforehand.

Some products have been devised to diminish these problems. One approach is to build a canopy which is higher. If the canopy top is much above the roof of the truck cab, the wind drag of the whole unit is increased. As the height of the canopy is increased above the top of the cab the appearance of the whole unit becomes less attractive. Hence a common approach is to raise only a portion of the roof to a height greater than cab height and to limit this increase to a value deemed to be a balance between more height inside and less attractive appearance and more wind drag. The resulting height, in models seen, does not permit an average person to stand upright inside.

In another approach, the box cover consists of a frame work of metal which is covered with fabric. Parts of the frame slide in tracks along the top of the box. This enables the unit to collapse forward, accordion-style. The result is good access to the cargo area. The styling of the unit is less attractive than units made of rigid material and the theft and animal resistance of fabric is less than that of rigid material.

Another device directed toward the solution of the problem is a roll-out tray for the cargo area. A sturdy tray on rollers covers a large portion of the cargo area. It rolls out of the cargo area, to the rear. Hence a person may access the contents of the tray without stooping and going into the cargo area personally. The tray does not enable the loading of the entire cargo area because of the fenders in the truck box.

While various devices offer certain advantages, it is believed that the invention offers useful advantages over those presently available. An object of the invention is to provide a box cover which provides easy access and enables the operator to stand upright in the cargo area. It is also an object that the box cover allow loading of objects as high as the interior space permits. A further object is to provide a box cover which can easily be adjusted to enable the carrying of objects higher than the normal maximum interior height. A device which can enable present truck canopies to be adapted to accommodate these objectives is an included goal of the invention.

SUMMARY OF THE INVENTION

Accordingly the invention consists of rotation means, preferably a hinge to connect a truck box cover to the side of a truck box. The hinge axis of rotation is generally parallel to the longitudinal axis of the truck box and near one side of the box. The hinge allows the box cover to rotate about the hinge axis and thus move to an open position where there is easy access to the cargo area. A prop between the truck box and the box cover holds the box cover in an open or lifted position. Because some box covers are heavy, a lifting device is connected between the truck box and the box cover. Preferably the lifting device and the prop are combined into one unit called an actuator. The actuator can be a gas spring or a screw powered by an electric motor. The actuator also helps to prevent the cover from opening too far or from closing too quickly. Preferably the actuator is mounted near the front of the truck box so as to leave the cargo area clear. A stiff frame is provided to prevent the box cover from large stresses or deflections which may damage it. The frame is made of strong, stiff material, preferably metal. The frame has a front arm, a rear arch and a torsion member. The front arm extends from one side of the box cover to the other near the front of the box cover. The front arm provides an attachment point for the actuator. It transfers lift from the actuator to the side of the canopy opposite the hinge. It stiffens the canopy laterally by connecting the free edge to the hinged edge. The rear arch crosses the cargo area transversely near the rear of the truck box. It arches up so as to be out of the way of the cargo area and the access pathway. The rear arch connects the free edge to the hinged edge of the box cover at the rear of the cover. Preferably the invention can be utilized with existing box covers. These covers are often very flexible and weak; designed to be supported at the bottom edges of the two sides. The actuator is preferably located near the front of the box cover. As it lifts the box cover at the front, the rear of the box cover tends to lag behind. It does this by twisting. In order to prevent excessive twist, the frame has a torsion member connecting the front arm and the rear arch. This enables the box cover to be opened without an actuator near the rear of the truck box, thus maximizing the accessibility. The frame is preferably secured to the hinge so that forces are transferred to the hinge and subsequently to the truck box and not to the relatively weak box cover. An over-opening restraint may be provided and preferably consists of a flexible member, such as a rope. One end of the restraint fastens to the truck box on the side of the truck opposite the hinge. The other end of the restraint fastens to the edge of the box cover in an area generally above the first mentioned end of the restraint. The length of the restraint is such that is becomes taut as the box cover is raised to its maximum open position. An elastic capability is preferably incorporated into the restraint. This will absorb the shock of a rapid stopping of the opening of the box cover. A pull-down device depends form the free edge of the box cover. When the box cover is in the open position an operator standing on the ground can grasp the pull-down device to pull the box cover down to a closed position. Preferably the pull-down member and the over-opening restraint are combined into one flexible element such as a rope. At least one steady-strut may be detachably fastened at its upper end to the free edge of the box cover when the box cover is in an open or partly open position. The steady strut would be fastened at its lower end to the truck box. The steady strut is preferably of an adjustable length. The steady strut steadies the canopy in an open or partly open position. This allows travel with the box cover partly open to accommodate an object of such height that the box cover may not be closed. At least one latch holds the box cover in a closed position. The latch preferably consists of a hook shaped member preferably fastened to the box cover. The latch is biased, preferably by a spring, to a position where it will engage with the flange on the truck box. A latch control means, preferably a Bowden cable, enables the operator to operate the latch to disengage it from the secured position.

In another aspect of the invention the frame is external to the box cover rather than internal. In this case the frame comprises a front arch, a rear arch and a torsion member. The front and rear arches generally follow the sides and roof of the box cover. The external frame functions in a similar fashion to the internal frame. The external frame allows the carrying of loads on the top of the box cover by having them supported on the external frame. The loads on top of the box cover are removed before the box cover is tilted open.

In another aspect of the invention the frame has a front arm but the torsion member is replaced by another element. That element is box cover stiffness. The box cover has torsional stiffness built into its structure. Preferably this is done by bonding a material to the roof which will provide torsional stiffness to the box cover as a whole. Preferably plastic form is bonded to the roof and then covered with a skin of fibre-reinforced reinforced resin so as to form a torsionally stiff structure.

In a further aspect of the invention the frame and general features are built integrally with a box cover and generally as in the form where the frame is a separate unit to be used with a box cover of ordinary design.

DETAILED DESCRIPTION

Figures 1, 1A:
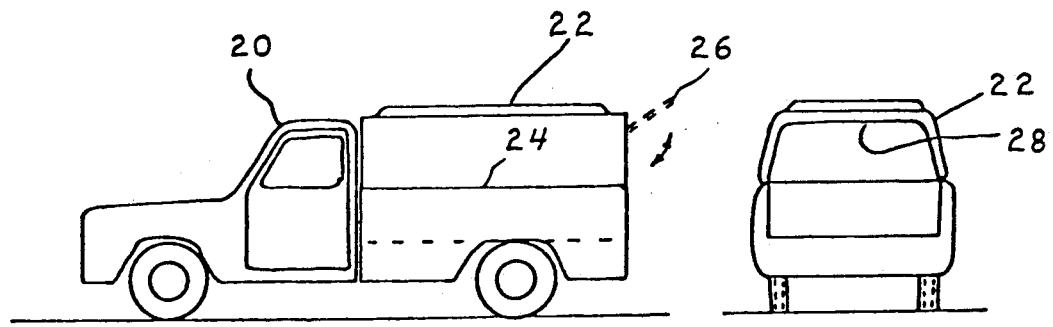
FIG. 1 is a side elevation of a truck and a conventional box cover.
FIG. 1A is a rear view of FIG. 1.
Figures 2, 2A:
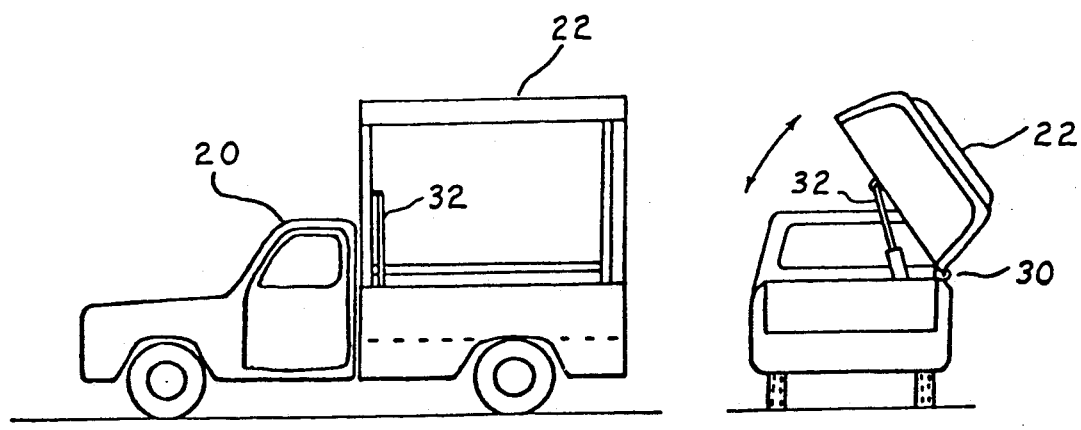
FIG. 2 is a side view of a truck and box cover with the invention having tilted the box cover to an angular, open position.
FIG. 2A is a rear view of FIG. 2.
Figure 3:
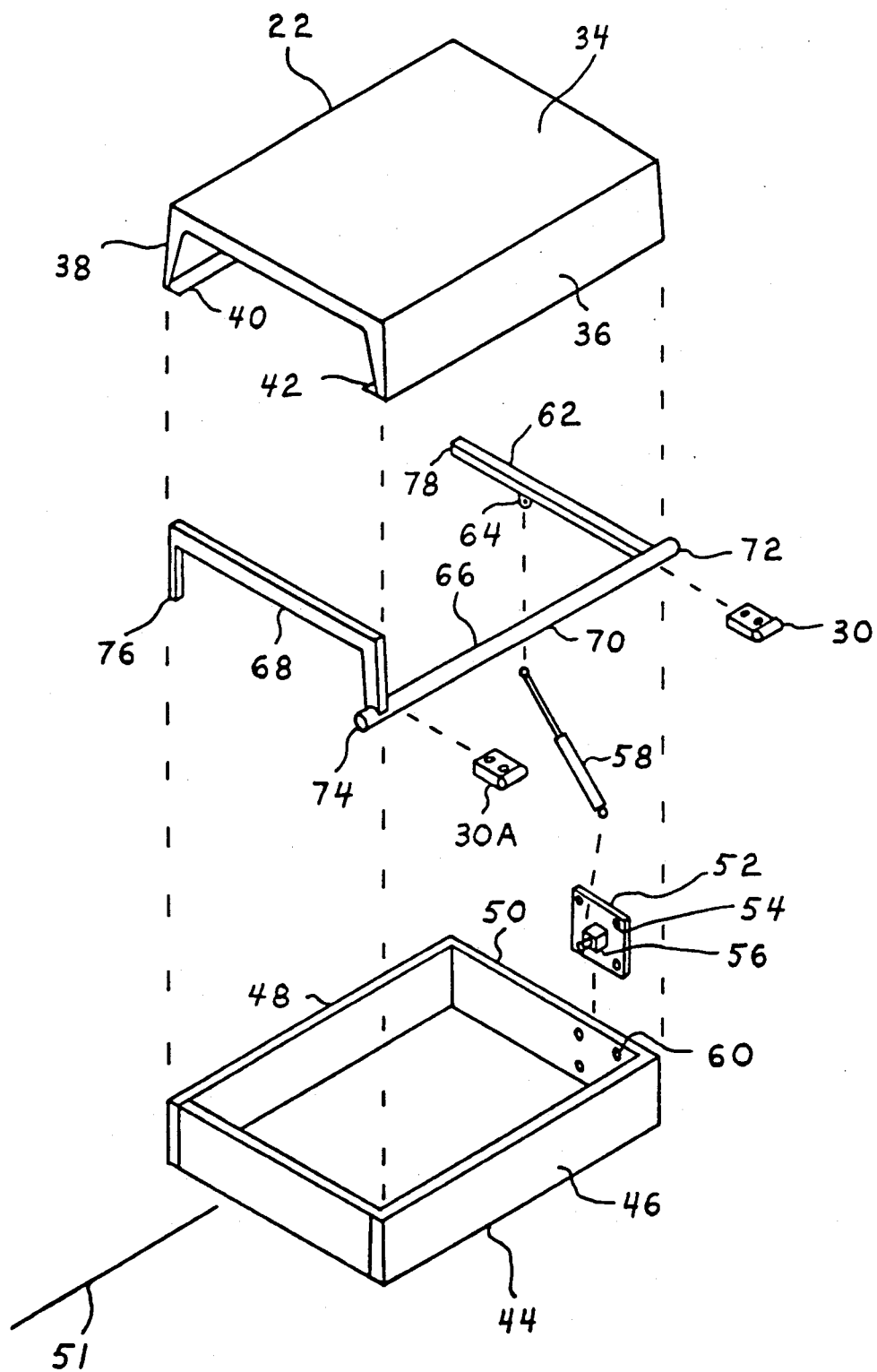
FIG. 3 is an exploded perspective view of a truck box, a box cover and the opening device, viewed from above the right rear.

Referring to the drawings, the preferred embodiment of the invention is shown in various figures. In FIG. 1 is shown a light truck 20 with a box 24. The box is covered by a box cover 22. The rear of the box cover has a hinged door 26 which opens to provide access to the cargo area. In FIG. 1A the rear opening of the box cover has a lintel 28 over it. In FIG. 2A the box cover is shown tilted to an open position by pivoting about hinge 30. An actuator 32 is holding the box cover in an open position. This enables a person to stand upright in the cargo area. In FIG. 3, a box cover is shown generally at 22. It has a top 34, left side 38 and right side 36. At the base are two flanges which are suitable for mounting the box cover namely left flange 40 and right flange 42. A truck box is shown generally at 44 and has a right side 46, a left side 48, and a front 50. The box cover is joined to the box by hinges 30 and 30A which fasten to the side 46 of the box. The hinges are positioned so the box cover can rotate about an axis which is generally parallel to the longitudinal axis 51 of the truck. The axis of rotation is near one side of the truck box.

To help open the box cover, to keep it open, and to help prevent over-opening, an actuator 58 is used. One end of the actuator is pivotally fastened to the truck box. This is accomplished by actuator bracket 52 which has a mounting lug 56 which is connected to one end of the actuator. The actuator bracket is attached to the truck box with fasteners through holes 54 and holes 60.

The second end of the actuator is connected to a frame shown generally as 66. The frame comprises a front arm 62, a rear arch 68, and a torsion member 70. The three members of the frame are made of rigid material preferably metal and are rigidly attached to each other. The front arm of the frame has an attachment lug 64 which connects to one end of the actuator. The frame, in a view from the top, has a rectangular outline with four corners. The four corners are labeled as items 72, 74, 76 and 78. In a general sense, explained in greater detail subsequently, the four lower corners of the box cover are fastened to the corresponding four corners of the frame. The two hinges, 30 and 30A, are attached to the frame, near the frame corners 73 and 74 respectively. Because the hinges are also fastened to the truck box, the box, the box cover, and frame are interconnected at the hinge side of the box and box cover which is, in this embodiment, the right side. On the left side, the box cover is fastened to the frame and the two much move together. On the left side, the frame and the box cover are not fastened to the truck box and are thus free to move upward. As the actuator provides a lifting force on the front arm the front arm tends to pivot about the hinge which is near the right end of the arm. The end of the arm opposite the hinge tends to rise carrying the left front corner of the box cover upward. The movement of the front arm causes the torsion member to rotate. Rotation of the torsion member causes the rear arch to rotate about the hinge axis. As the left rear corner of the box cover is attached to the rear arch, the left rear corner of the box cover lifts. Thus the force applied by the actuator tends to rotate the entire box cover.

Figure 4:
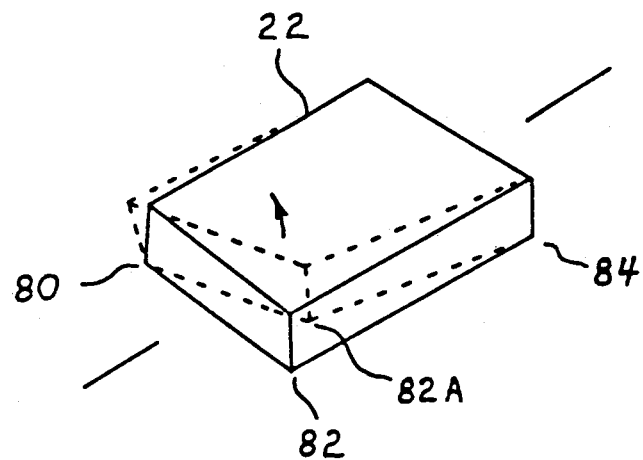
FIG. 4 is a schematic perspective view of a box cover showing twist.
Figure 5:
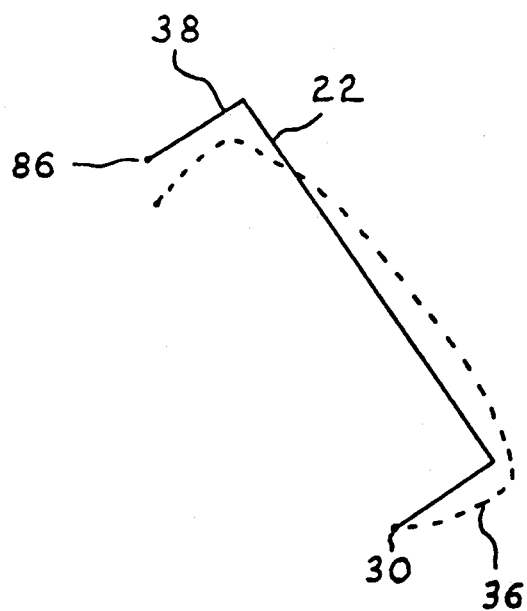
FIG. 5 is a schematic end sectional view of a box cover.

An actuator located near the front of the truck box is desireable because it is out of the way of loaded cargo and out of the way of the access route in and out of the cargo area. An actuator near the rear of the box would be in the access pathway. The arrangement of the preferred embodiment leaves the access route with optimum openness since the rear arch goes up over the rear doorway of the box cover and generally is in close proximity to the box cover. An object of the invention is to enable the use of existing box covers and using the invention to tilt them to an open position. Existing common box covers are made to be supported at the bottom edges. They are generally weak and flexible under a situation where they are not supported, at least at the four bottom corners. In FIG. 4 a box cover 22 is depicted. When using one actuator mounted near the front of the box, the actuator will tend to lift the front corner 82 of the box cover. The front cover of the box cover, in a lifted position 82A, is shown in dashed lines. Because of the lack of torsional rigidity of common box covers, the rear corner 84 will not move in unison with the front corner. This twist of the box cover is undesireable and a purpose of the frame previously described is to prevent excessive twist of the box cover. The stiffness of the torsion member tends to cause the front part of the box cover to rotate about the hinge axis in unison with the rear part of the box cover. A further benefit of the frame is to reduce the amount of deflection of the side wall of the box cover. FIG. 5 depicts in schematic form a sectional end view of a box cover in a tilted-up position. The weight of the box cover is supported generally by hinge 30. The weight of the box cover tends to deform the side wall 36. The deformed position is depicted in dashed lines, and is exaggerated. The frame previously disclosed helps to reduce the side wall deflection. In FIG. 5, if the points 30 and 86 were joined by a structural member, such that the length from 86 to 30 is virtually constant, then the weight of the box cover now causes deflection of side wall 38 as well as side wall 36. Since the weight is now resisted by two walls, the deflection is less, as is desireable. In FIG. 3 the front arm 62 can be seen to join the two side walls. The rear arch 68 can be seen to join the two sidewalls. Thus the frame helps to lessen the sidewall deflection of a box cover, when the cover is tilted.

A further advantage of the torsion member is that it can help to resist twisting of the box cover which may occur due to wind. As the box cover is being opened, or is open, the wind could tend to move the rear section of the canopy out of unison with the front section. The stiffness of the torsion member tends to prevent such twisting of the box cover.

Figure 6:
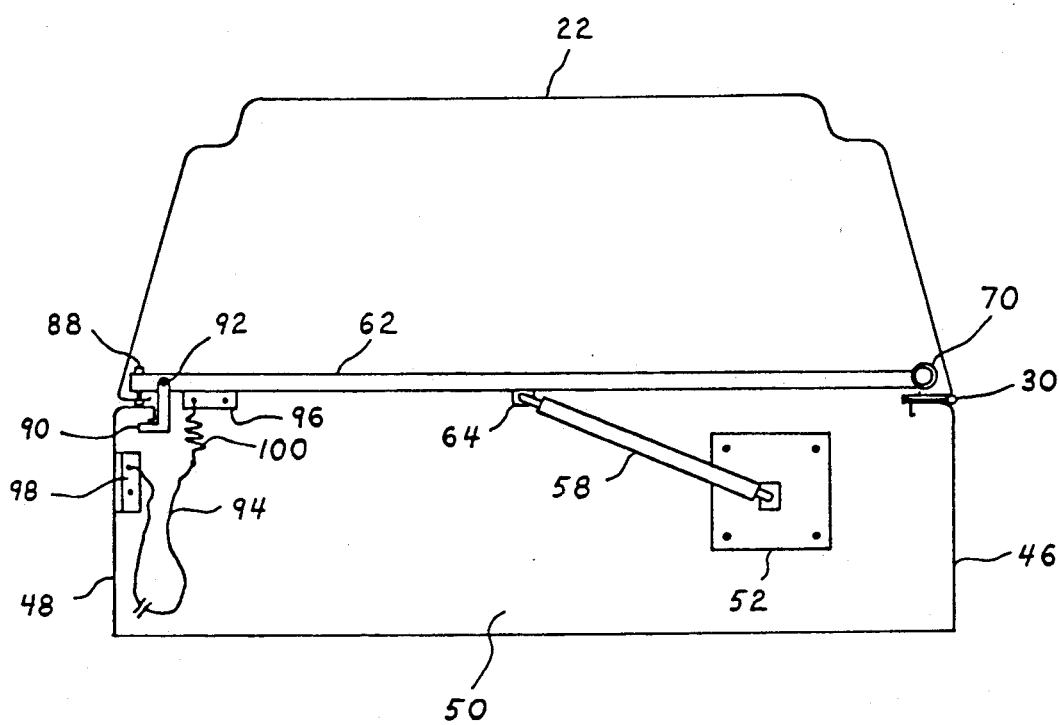
FIG. 6 is an end sectional view from the rear, near the front of the truck box, of a box cover and a truck box with the invention, the box cover being in a closed position.

In FIG. 6 the box cover is shown in the closed position. The actuator 58 is in a retracted position and in the preferred embodiment comprises a gas spring. What is meant by a gas spring is now described. A gas spring is a commercially available device comprising two forms, a regular form and a locking form. Both forms comprise a cylinder containing gas under pressure. A piston in the cylinder moves within the cylinder. A rod is connected to the piston. The gas pressure tends to force the rod out of the cylinder. The speed at which the rod moves is slowed by the presence of oil within the cylinder. The gas spring has mounting connections at two points, one on the rod end and one on the cylinder. The first form of gas spring provides a rod which pushes out with force and may be pushed back in by a greater force. The second form of gas spring, the locking form has a rod which pushes out with force and which may be pushed in by a greater force, and has the ability to practically lock the rod in any position with respect to the cylinder. The actuator may alternately by a screw powered by an electric motor or another form of actuator. A hinge 30 connects the box cover to the truck box. A fastener 88, such as a bolt connects the front arm to the box cover. A hook shaped latch 90 is pivotally joined to the front arm 92. The latch engages the underside of the flange on the truck box 48. A biasing means such as a spring (not shown) urges the hook into the engaged position. A latch control means (not shown) such as a Bowden cable engages an operator to move the latch past the edge of the truck box so that the box cover is free to move upward.

Figure 7:
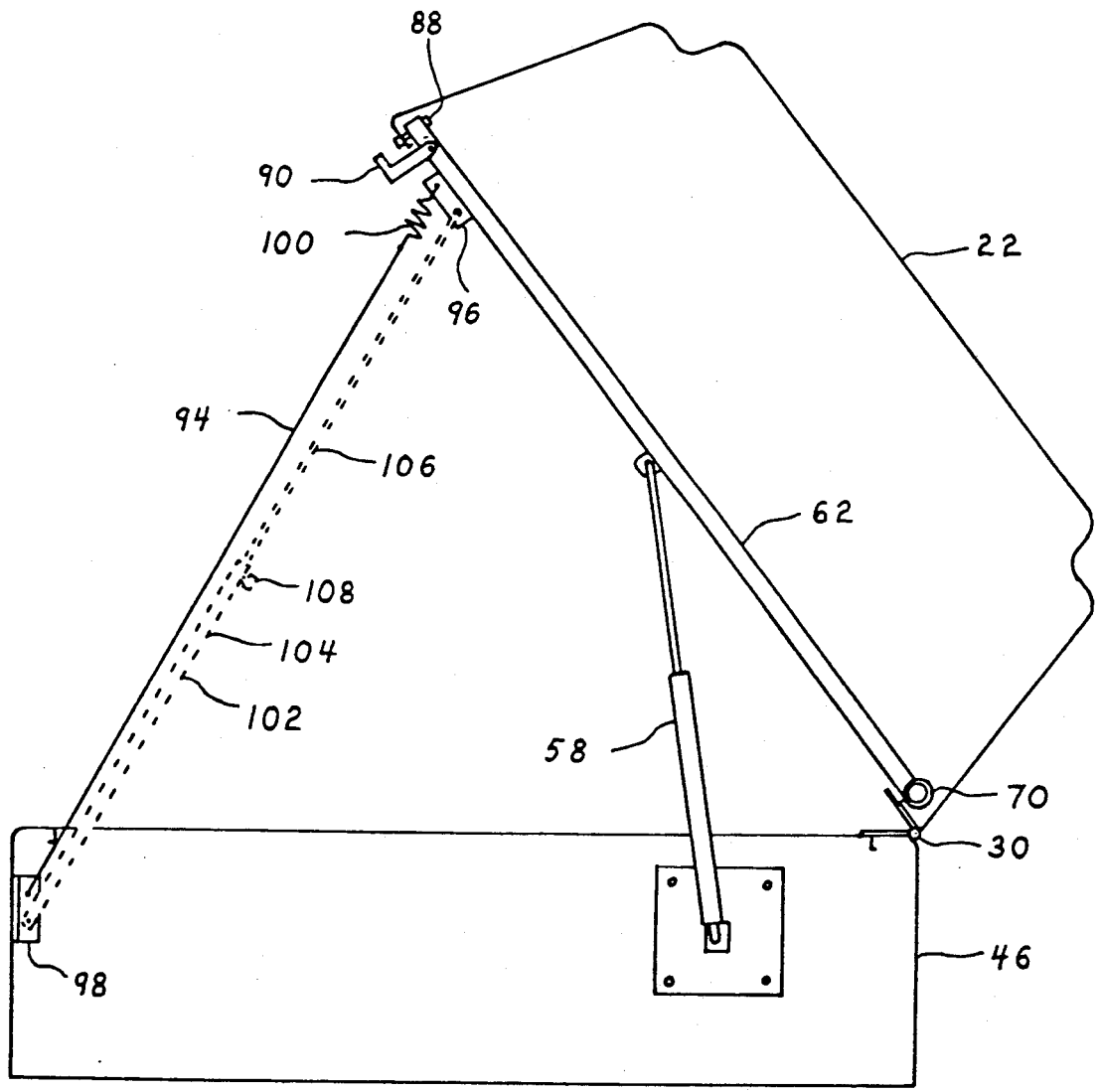
FIG. 7 is a view as in FIG. 6 but with the box cover in an open position.

A flexible connector 94 is joined to bracket 98 which is mounted to the truck box side 48. The flexible connector may be a fabric strap. The flexible connector is fastened to an elastic device 100 such as a helical metal extension spring. The elastic device is fastened to the bracket 96 which is joined to the front arm. The length of the flexible connector is such that it becomes taut as the box cover is moved to its maximum open position. The flexible connector thus stops the box cover from over-opening due to such factors as its own inertia or wind. The elastic device absorbs some of the shock of the box cover coming to rest as the flexible connector becomes taut. The flexible connector also serves as a means for an operator to pull the box cover down from an open position. By standing on the ground an operator can grasp the flexible connector to pull the box cover down. In the preferred embodiment, there are two flexible connectors, one near the front of the box cover and one near the rear. In FIG. 7 the box cover is shown in an open position. It has pivoted about hinge 30, aided by force from the actuator 58 which is now in an extended position. The flexible connector 94 is taut. A removable and optional feature is a steady strut shown in dotted liens and labelled generally as 102. The steady strut is a stiff column which may be variable in length. In the preferred embodiment it consists of telescoping tubes namely outer tube 104 and inner tube 106. The inner tube has a series of holes in it which engage with a pin 108. The pin goes through a chosen hole in the inner tube and through a hole in the outer tube. Hence the steady strut can be secured in a multiple of lengths. The steady strut can be attached, as by a pin, to bracket 98. At its other end the steady strut may be fastened, as by a pin, to bracket 96. When fastened to both brackets the steady strut holds the box cover at a fixed position of opening. Thus it prevents the box cover from vibration due to wind gusts or road bumps. The box cover can be steadied at a partially open or possibly a fully open position, for travel with cargo which is high enough to prevent closing the box cover fully. Preferably two steady struts are available, one to be installed near the front of the box cover and one to be installed near the rear of the box cover.

Figure 8:
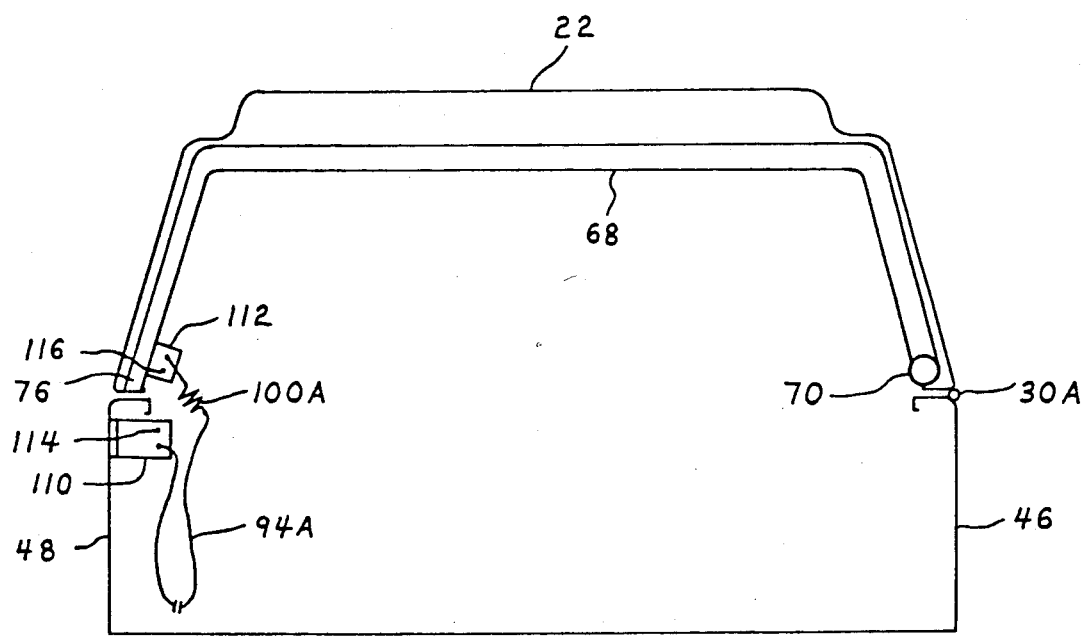
FIG. 8 is an end sectional view from the rear, near the rear of the truck box, of a box cover and a truck box and the invention.

In FIG. 8 the box cover is shown at the rear end and is in a closed position. Rear arch 68 joins torsion member 70. On the opposite side of the box cover the rear arch end 76 is fastened to the box cover. A flexible connectors 94A and elastic device 100A are shown. The flexible connector is fastened to bracket 110 which is fastened to the truck box side 48. The brackets 110 and 112 have mounting holes 114 and 116 respectively. These mounting holes are for the optional attachment of a rear steady strut (not shown).

Figure 9:
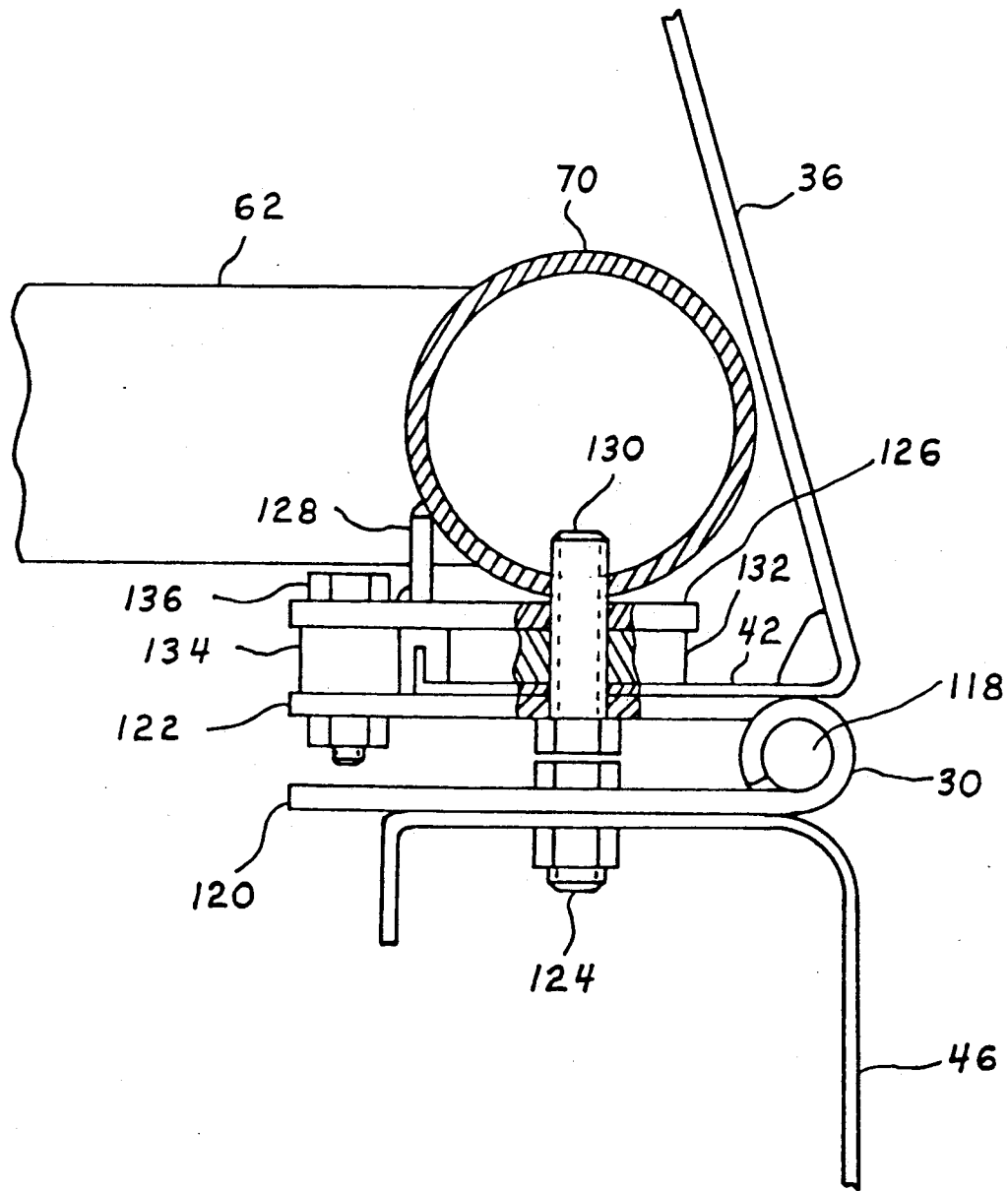
FIG. 9 is a fragmentary sectional view of the right front corner of the invention, looking forward.

In FIG. 9 is shown in detail the connection between truck box side 46 and box cover side 36. Hinge 30 comprises hinge pin 118, a lower hinge plate 120 and an upper hinge plate 122. The lower hinge plate is fastened to the side of the truck box by a bolt 124. Front arm 62 is rigidly joined as by welding to torsion member 70, preferably a metal tube. Below the torsion member is a horizontal bar 126. The horizontal bar is joined to the torsion member by a weld. Connecting the horizontal bar to the torsion member is a vertical bar 128 which is preferably welded to the horizontal bar and the torsion member. A threaded hole in the horizontal bar and the torsion members receives threaded fastener 130. Fastener 130 joins the right flange 42 of the box cover, the upper hinge plate and the torsion member. Spacers 132 and 134 are positioned as shown. Fastener 136, shown as a bolt and nut also connects the horizontal bar and the upper hinge plate.

Figure 10:
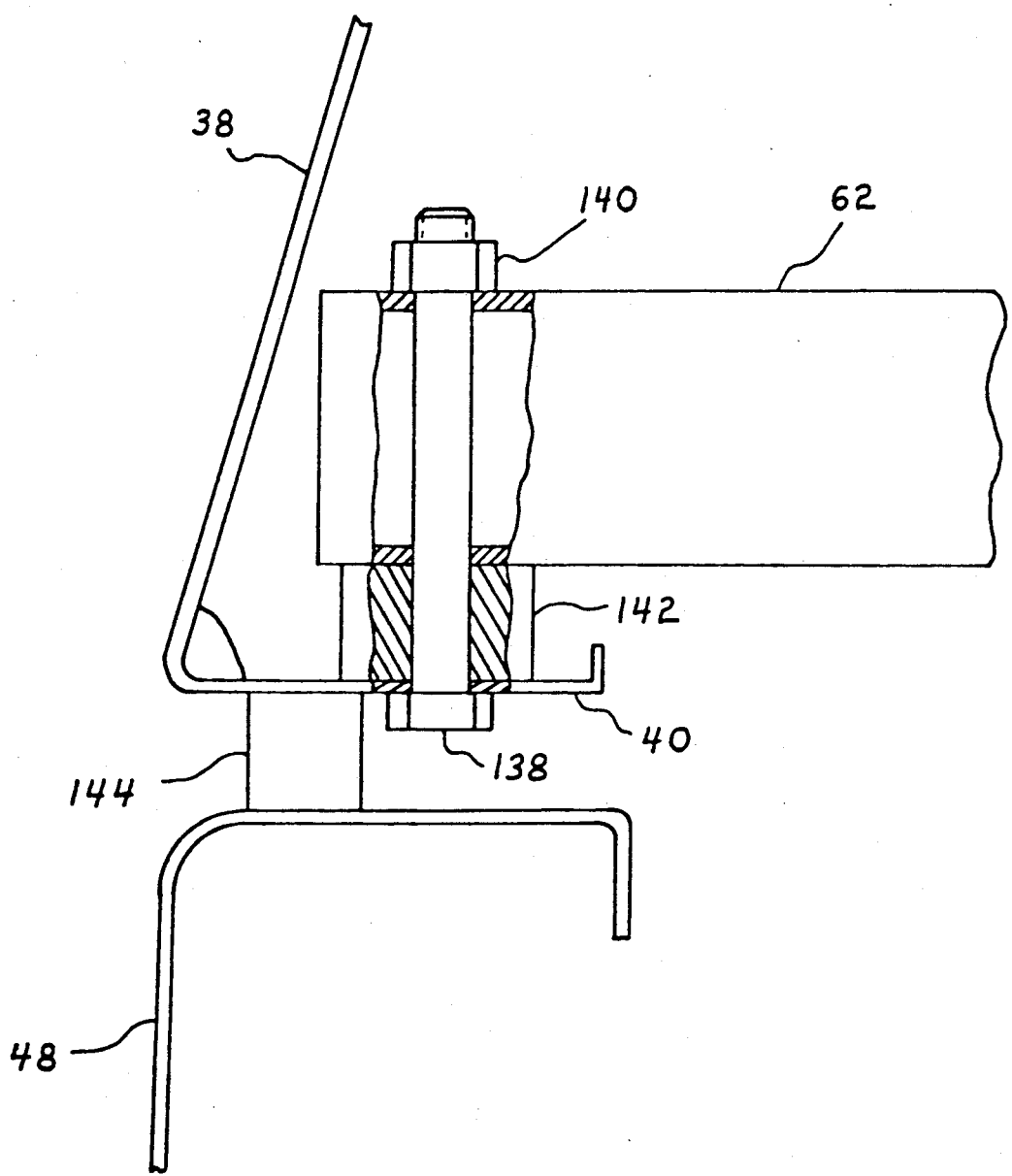
FIG. 10 is a fragmentary sectional view of the left front corner of the invention, looking forward.

In FIG. 10 is shown a detail in which the box cover is in a closed position. Box cover left side 38 has a left flange 40. Front arm 62 is fastened to the left flange by a fastener such as bolt 138 and nut 140. A spacer 142 maintains a distance between the front arm and the box cover. A resilient spacer 144 is joined to the box cover preferably by adhesive. The resilient spacer is not joined to the truck box. Hence when the box cover rises the resilient spacer travels with it. The resilient spacer keeps the box cover at a distance from the truck box. Thus the space between the two is the same as the space on the hinge side. The resilient spacer keeps dirt and water out of the cargo area, and although not shown extends around the circumference of the top of the truck box.

Figure 11:
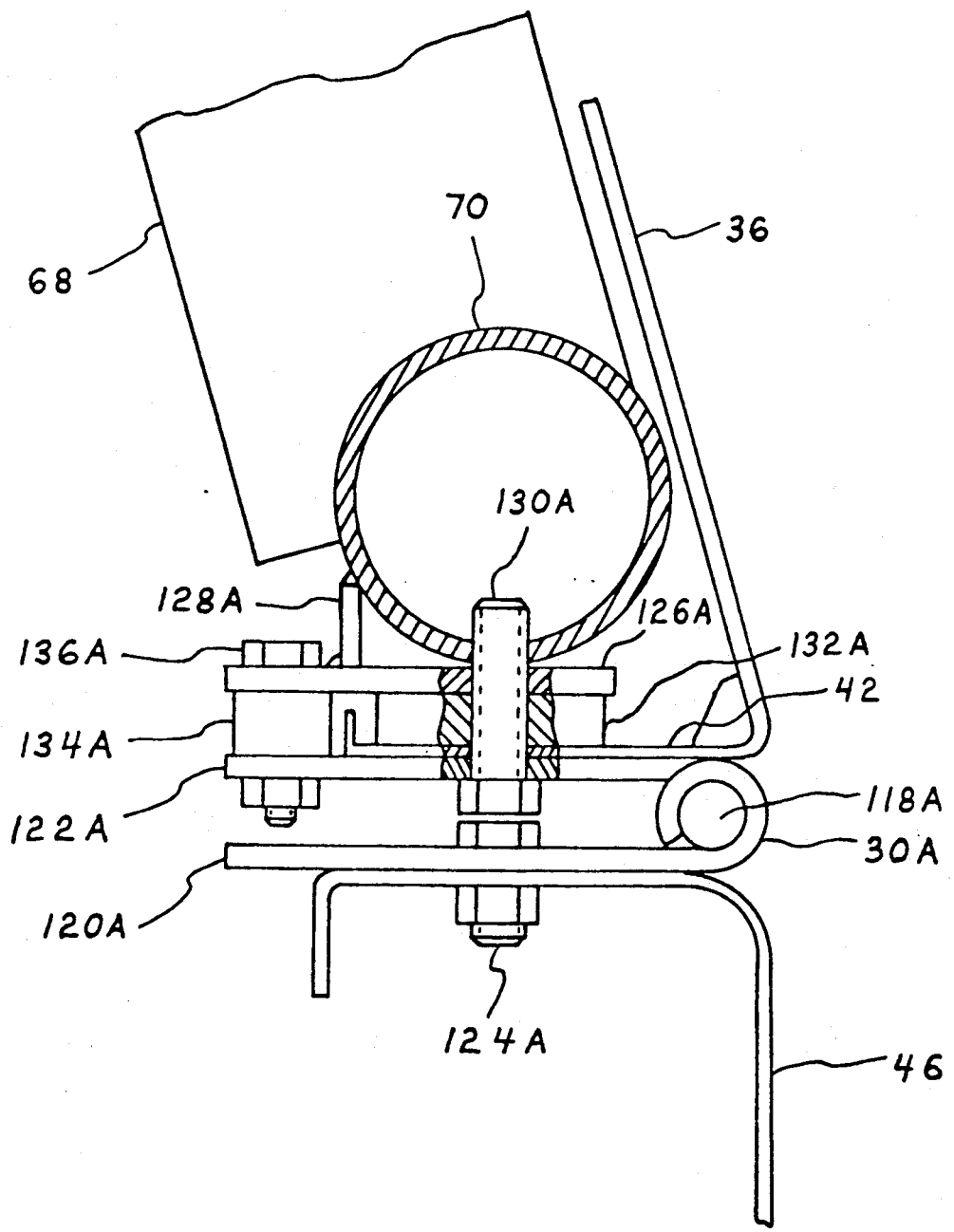
FIG. 11 is a fragmentary sectional view of the right rear corner of the invention, looking forward.

A detail is shown in FIG. 11 in which the box cover is in a closed position. FIG. 9 is similar to FIG. 11 and the part numbers 30 and even numbers 118 to 136 inclusive correspond in both figures with the parts in FIG. 11 having an 'A' suffix. In FIG. 11 the rear arch 68 is shown and is preferably made of metal. It is rigidly attached to torsion member 70, preferably by welding.

Figure 12:
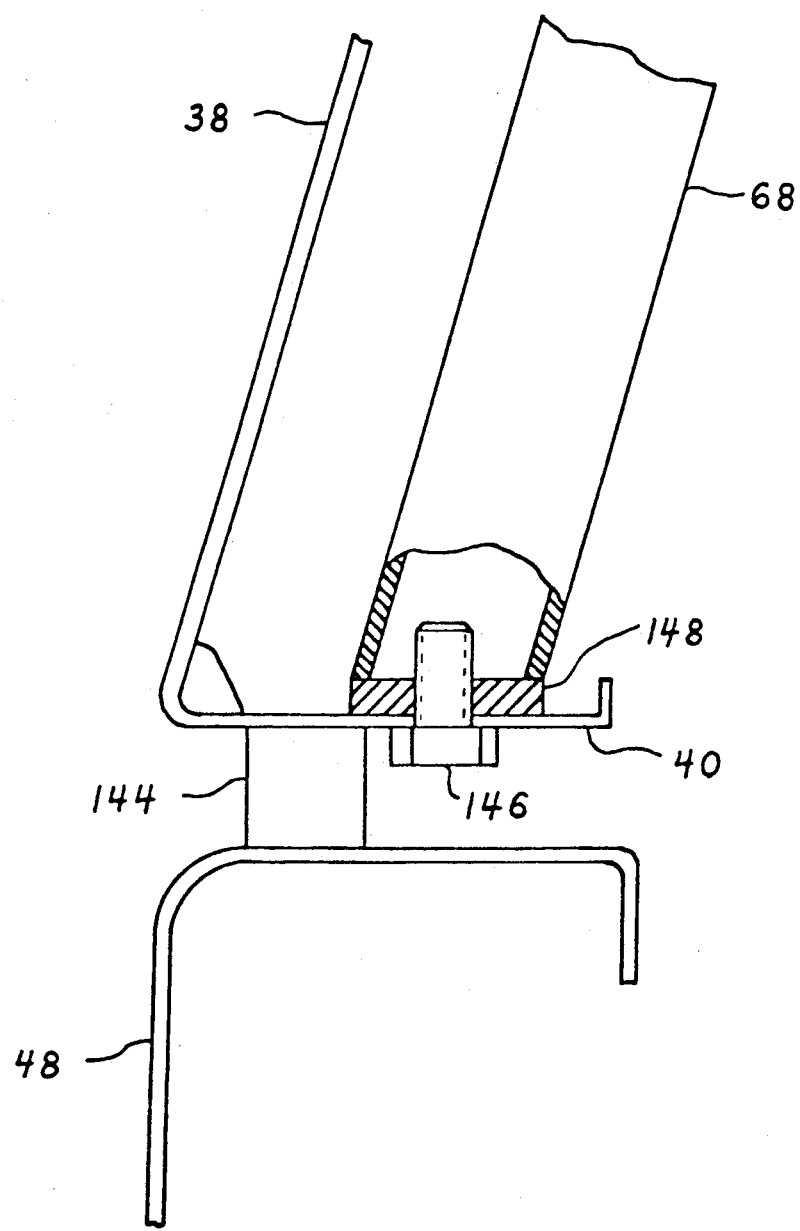
FIG. 12 is a fragmentary sectional view of the left rear corner of the invention, looking forward.

In FIG. 12 the detail shows the left side of the rear arch 68 and the situation shown is that of the closed box cover. Rear arch 68 is fastened to box cover side 38 by means of a fastener such as bolt 146 which passes through left flange 40 and engages threads in a threaded hole in end plate 148. End plate 148 is permanently joined to the rear arch.

In the preferred embodiment the torsion member is located near the hinge axis. The torsion member may alternately be located at another location where it is substantially parallel to the hinge axis and is rigidly attached to both the front arm and the rear arch.

Figure 13:
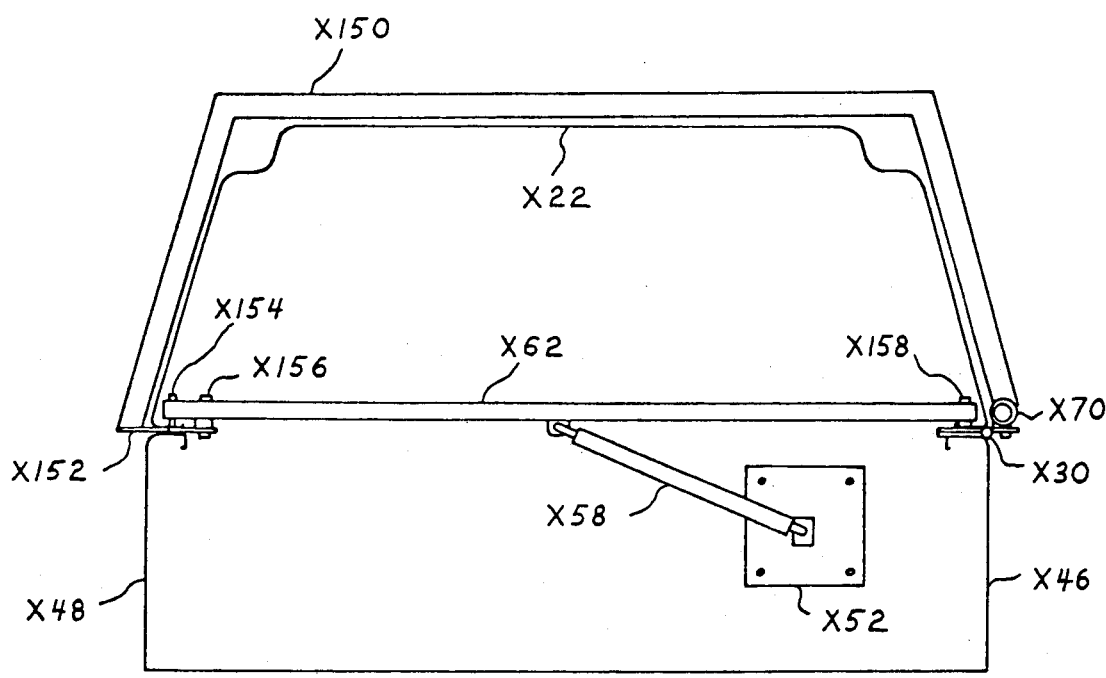
FIG. 13 is an end sectional view of a box cover, a truck box and a first alternate embodiment of the invention, viewed from the rear, the sectional plane being near the front of the truck box.

In an alternate embodiment a box cover is tilted by the use of hinges and a frame which is partly external to the box cover. This embodiment is shown in FIG. 13. In FIG. 13 a box cover X22 is mounted to a truck box with right side X46 and left side X48. A modified hinge X30 joins the box cover to the box. An independent front arm X62 crosses the cargo space near the front of the truck box. The independent front arm is joined to the box cover on the right side by a fastener X158. On the left side of the box cover, the box cover is joined to the independent front arm by a fastener X154. The fastener X154 and a fastener X156 fasten a plate X152 to the box cover and the front arm. The plate is rigidly fastened preferably by welding to front arch X150. The independent front arm and the front arch are made of strong rigid material, preferably metal tubing. On the right side the front arch is rigidly connected to torsion member X70. The torsion member is a stiff strong torsionally rigid member, preferably a metal tube. An actuator X58 is attached to the truck box by means of a bracket X52. The actuator is connected at its upper end to the front arm.

Figure 14:
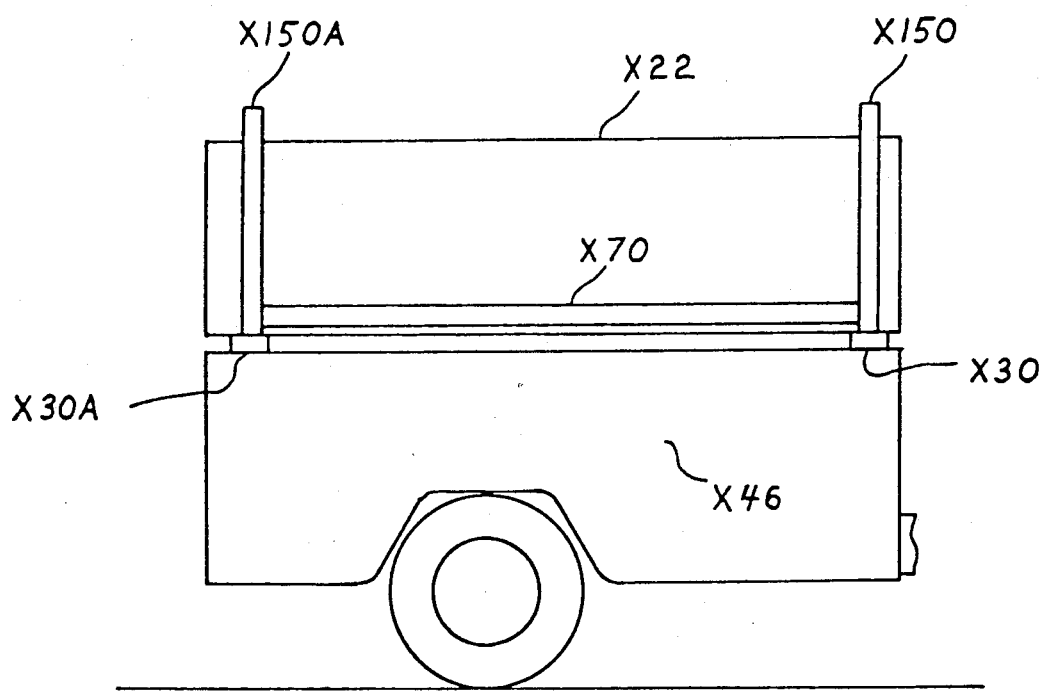
FIG. 14 is a side view of a truck box, a box cover, and the first alternate embodiment of the invention, viewed from the right side of the truck box.

At the rear of the box cover the frame comprises parts corresponding to those described in FIG. 13 except no independent front arm is used and no actuator or actuator mounting bracket is used. In FIG. 14 the view shows a box cover X22 mounted on a truck box with a box side X46. The mounting is by means of front modified hinge X30 and rear modified hinge X30A. A front arch X150 is external to the box cover. Rear arch X150A is positioned near the rear of the box cover. Torsion member X70 connects the two arches and is rigidly connected to both. The rear arch is connected to the box cover in the same manner as the front arch.

Figure 15:
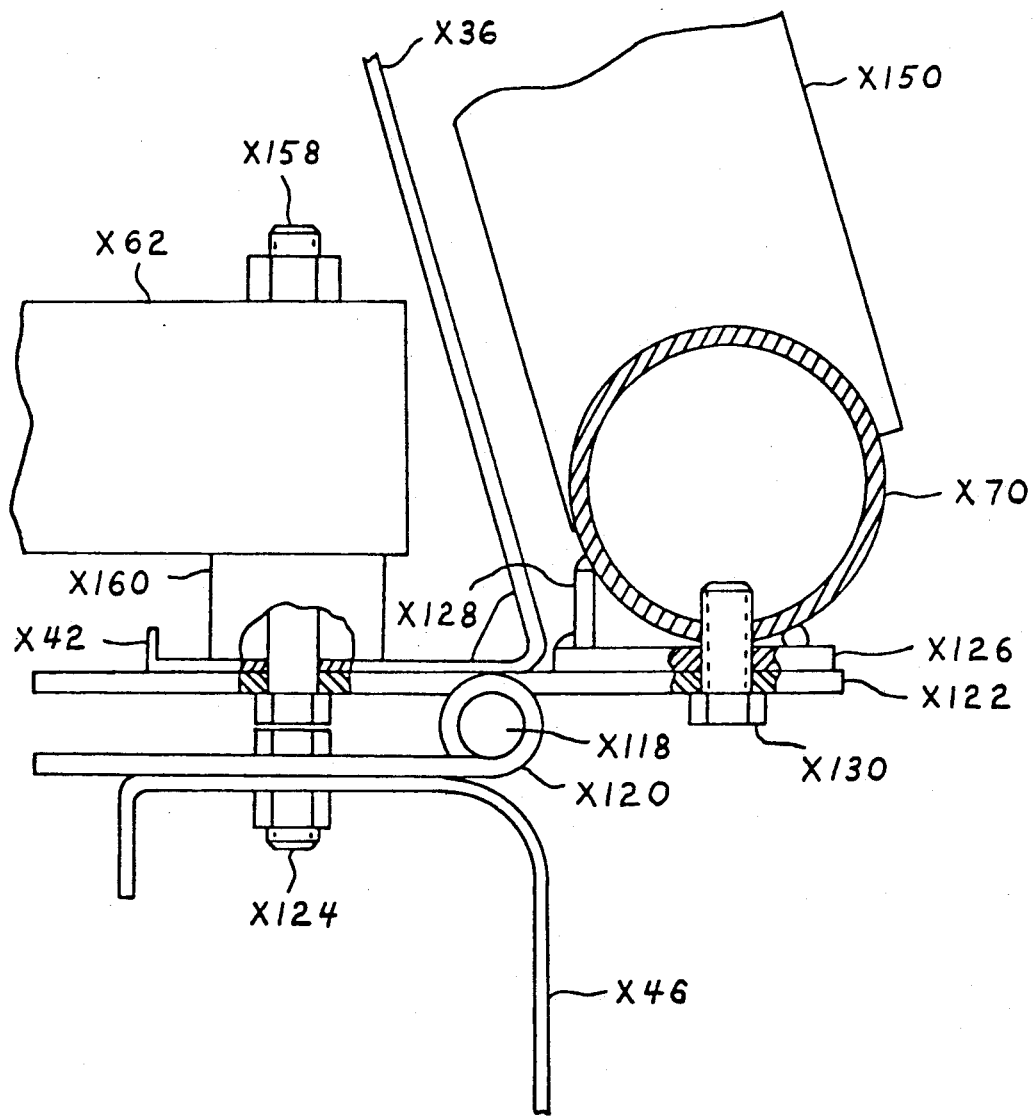
FIG. 15 is a fragmentary sectional view of the right front corner of the first alternate embodiment, looking forward.

In FIG. 15 a detail shows the connection for the external front arch X150 and various other parts. The position depicted is that of a closed box cover. The modified hinge comprises hinge pin X118, lower hinge plate X120 and upper hinge plate X122. The lower hinge plate is fastened to the truck box right side X46 by a fastener, preferably a bolt shown as X124. Independent arm X62, box cover right flange X42 and upper hinge plate X122 are all connected by a fastener X158 which passed through them. Encompassing the fastener is a spacer X160. Torsion member X70 has a horizontal bar X126 joined to it as well as a vertical bar X128. These bars serve to provide a mounting base. The torsion member contains a threaded hole to accept a threaded fastener X130. The fastener connects the torsion member to the upper hinge plate.

Referring to FIG. 13, when the actuator applies a force to the independent front arm, the left side of the arm tends to rise. Thus the left side of the front arch also tends to rise. As the front arch rotates about the hinge pin, it also rotates the torsion member. Now referring to FIG. 14, it can be seen that as the torsion member rotates about the hinge axis it causes the rear arch to rotate generally in unison with it. Thus front and rear arches rotate together causing front and rear sections of the box cover to open generally in unison.

The two external arches can be used to carry an external load located on top of and supported by the two arches. The load is removed before the box cover is tilted open.

Figure 16:
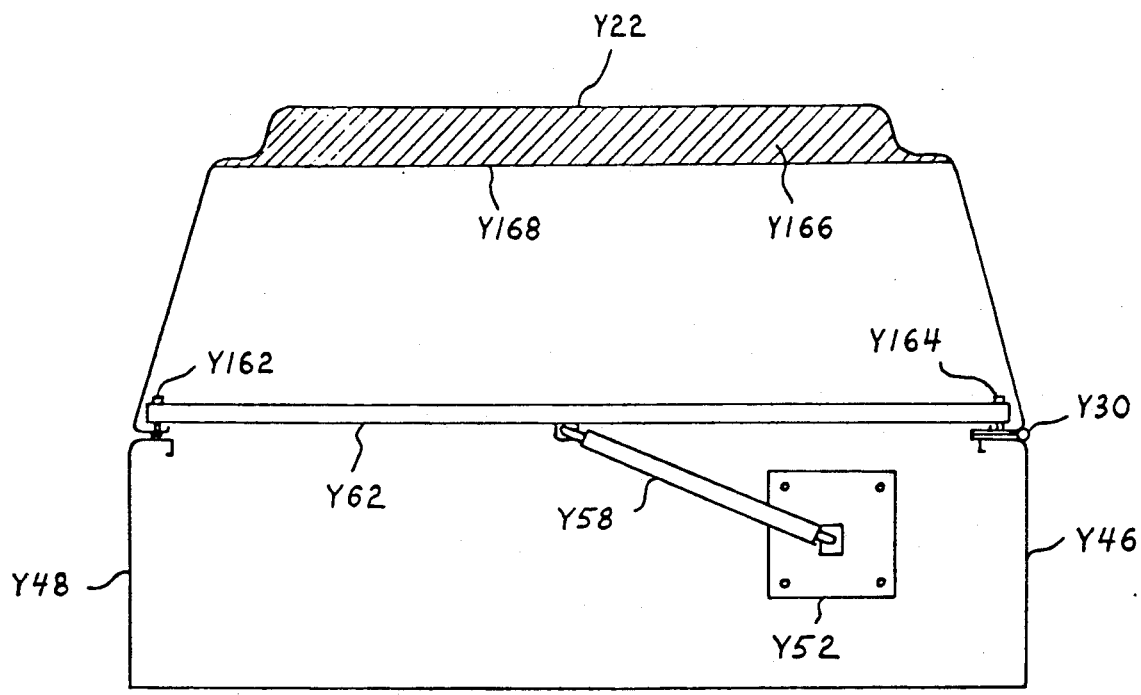
FIG. 16 is a sectional end view of a truck box and second alternate form of the invention, viewed from the rear.
Figure 17:
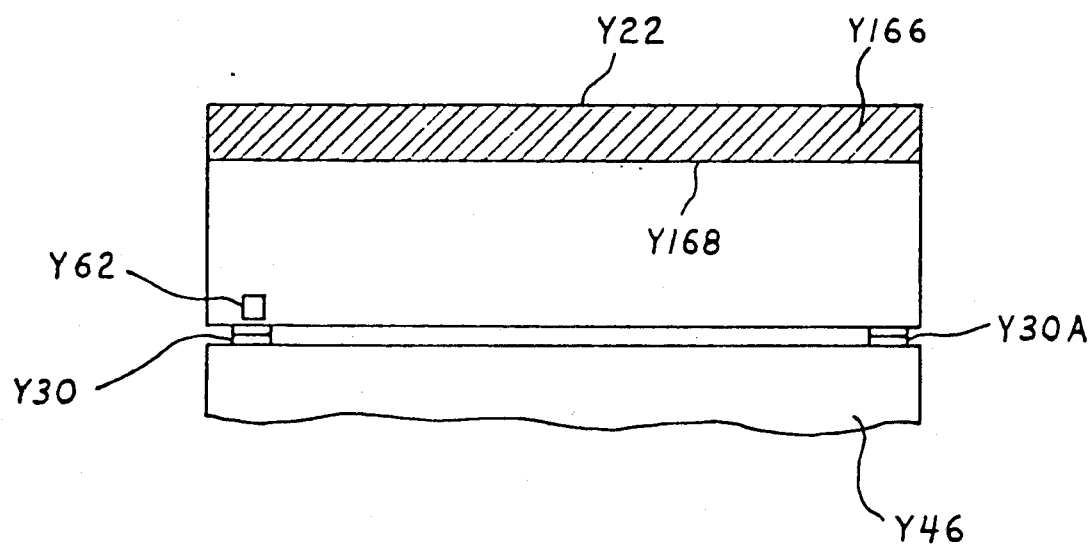
FIG. 17 is a sectional side view of the second alternate embodiment of the invention and part of a truck box, the sectional plane being parallel to the longitudinal axis of the truck, and the view from the centre of the truck looking to the right.

In another embodiment, the box cover itself is made stiff enough to perform some of the functions which were done by the frame in the preferred embodiment. The box cover has built in stiffness so that a separate torsion member is not required and a rear arch is not required. In FIG. 16 is shown such an embodiment. A box cover Y22 is shown in a closed position and is mounted on a truck box with right box side Y46 and left box side Y48. A hinge Y30 joins the box cover to the box right side. A front arm Y62 traverses the box cover near the front of the box cover. The front arm is made of strong rigid material preferably metal. The right end of the front arm is fastened to the box cover and the hinge by a fastener Y164, preferably a bolt and nut. The left end of the front arm is fastened to the box cover by a fastener Y162, preferably a bolt and a nut. At one of its ends, an actuator Y58 is fastened to the front arm. The other end of the actuator is fastened to bracket Y52 which in turn is fastened to the front of the truck box. Situated generally at the top of the box cover is a stiffening material Y166. This material may be rigid plastic foam or aircraft honeycomb. The rigid material is bonded by the roof by adhesive such as plastic resin. A surface layer Y168 is bonded to the stiffening material. The top of the box cover, the stiffening material and the surface layer form a structural unit which is torsionally stiff. This stiffness helps the box cover to resist the type of deformation depicted in FIG. 4. FIG. 17 shows this embodiment in a side view, in which Y46 is a portion of the right side of the truck box. A box cover at Y22 is fastened to the box with hinges Y30 and Y30A. The front arm is shown at Y62. The actuator is omitted for simplification. The stiffening material Y166 and the surface layer Y168 are shown. Referring to FIG. 16 and the operation of the parts; the actuator implies a force tending to raise the left end of the front arm. Since the front arm is fastened to the side wall, the box cover tends to rotate about the hinge axis. Since the box cover is torsionally stiffened, the rear section of the box cover moves in sufficient unison with the front section. The advantage of this embodiment is that some separate frame members of the preferred embodiment are not required. The disadvantage is that a more expensive box cover is required.

In operation, referring to FIG. 1, an operator standing on the ground opens the rear door 26 of the box cover. By operating a latch control means, not shown, the latch 90, FIG. 6 is disengaged from the box and the box cover is now ready to be raised to the open position shown in FIG. 2 and FIG. 2A. In the case where the actuator is a gas spring, the force of the spring is preferably chosen such that the box cover must be given an upward lift by the operator to get it to move from its closed position. After providing some manual assistance in raising the edge of the box cover, after reaching a certain height, the box cover will move upward on its own, lifted by the gas spring. The damping ability of the gas spring tends to keep the upward movement at a limited rate. At the top limit of the movement of the box cover, flexible connector 94, FIG. 7 stops the movement. Elastic device 100 cushions the shock of the halt in movement. The cover will remain up and requires a force to pull it downward. The operator may now load objects over the side of the box or through the rear. He may enter the cargo area where he may stand without stooping, use a wheeled dolly or utilize an overhead crane to load cargo. The overhead crane cannot reach the extreme hinge-side of the cargo area. The operator may wish to install the optional steady struts, 102. This may be because there is gusty wind and the cover will be open a long time. Another situation where the steady struts may be used is where the cargo is too high to allow full closure of the box cover. The steady struts will steady the cover in a partly open position. Assuming the steady struts are not installed, the operator may now close the box cover by grasping it and pulling it downward. If the operator is standing on the ground and cannot reach the raised edge of the box cover, the operator may grasp the flexible connector and pull down on it. Once the box cover nears the bottom of its travel, it will move downward without assistance. The operator may now secure the latch. If the actuator is a screw driven by an electric motor, the operation would be similar but some differences would occur. In this case an electric control for the motor is located at a convenient point. No manual effort is required to lift the box cover or lower it other than the manipulation of the motor control.

Wind can be a significant factor in the forces on the box cover in the open position. In the case of a gas spring actuator, the force required to pull the box cover down is chosen to be substantial. This provides a substantial resistance to wind closing the box cover. Caution is still required and in high winds, the operator should use discretion in deciding whether to open the box cover.

The embodiments of the invention in which an exclusive property or privilege is claimed are defined as follows:

1. A tilting device for a box cover disposed on a truck, the box cover having opposite lateral sides, and the truck having a truck box with opposite lateral sides and a longitudinal axis, the tilting device comprising:
   (a) rotation means comprising at least one hinge disposed between the box cover and the truck box on one side thereof, the hinge having an axis of rotation, and the axis of rotation being generally parallel to the longitudinal axis of the truck box, said rotation means for enabling the box cover to be rotated from a closed position to an open position;
   (b) a rigid frame comprising a torsion member, a front arm, and a rear arch;
      said torsion member is an elongated member having a first end and a second end, and extends generally parallel to the longitudinal axis of the truck box;
      said front arm is a horizontally disposed elongated member having opposite ends, one end of said arm is attached to the first end of said torsion member and is generally perpendicular to said torsion member;
      said rear arch having a first end and a second end, the first end of said arch is attached to the second end of said torsion member and is generally perpendicular to said torsion member, said arch comprising a first portion extending upwardly from the attachment to the torsion member, a second portion extending horizontally from the uppermost end of the first portion, and a third portion extending downwardly from the end of the second portion that is distal from the torsion member;

said frame member being attached to the box cover for torsional strength during tilting.

2. The tilting device of claim 1 further comprising:
(c) actuation means disposed between the truck box and the box cover for exerting an upward force on the box cover to rotate the box cover about said rotation means to said open position.

3. The tilting device of claim 1 in which the torsion member has a longitudinal axis and the longitudinal axis of the torsion member is spaced from the axis of rotation of the hinge.

4. The tilting device of claim 2 in which the actuation means is a gas spring.

5. The tilting device of claim 2 in which the actuation means is attached to said front arm.

6. The tilting device of claim 1 further comprising:
(d) a flexible connector disposed between the box cover and the truck box on the side of the truck opposite to that on which said rotation means is located, said flexible connector for preventing the box cover from opening beyond a predetermined angular position and for grasping when one wishes to move the box cover from said open position to said closed position.

* * * * *